United States Patent [19]

Titze

[11] 4,031,651

[45] June 28, 1977

[54] FISHING ROD HOLDER WITH AUTOMATIC HOOK SETTER

[76] Inventor: Paul O. Titze, R.R. No. 2, Mitchell, S. Dak. 57301

[22] Filed: Mar. 30, 1976

[21] Appl. No.: 672,001

[52] U.S. Cl. .................................... 43/15; 43/21.2
[51] Int. Cl.² ......................................... A01K 97/00
[58] Field of Search ............................... 43/15, 21.2

[56] References Cited

UNITED STATES PATENTS

| 1,957,853 | 5/1934 | Sibley | 43/15 |
| 3,762,090 | 10/1973 | Nelson et al. | 43/15 |

Primary Examiner—Russell R. Kinsey
Assistant Examiner—Daniel J. Leach
Attorney, Agent, or Firm—Clarence A. O'Brien; Harvey B. Jacobson

[57] ABSTRACT

A fishing pole holder and automatic hook setter, which comprises a vertical standard support, having a tubular sleeve holder pivoted at the upper end thereof for the reception of the butt end of the fishing pole, a horizontal support member having a trigger arrangement mounted upon it for the reception of the intermediate portion of the pole and differentially tensioned spring members extending between the tubular sleeve holder and the support system to bias the fishing pole upwardly. The trigger mechanism locks the fishing pole against the bias of the spring actuated pole holder, and may be set to be actuated by varying sized pulls on the fishing line. All parts are collapsible and storable within a tackle box.

5 Claims, 3 Drawing Figures

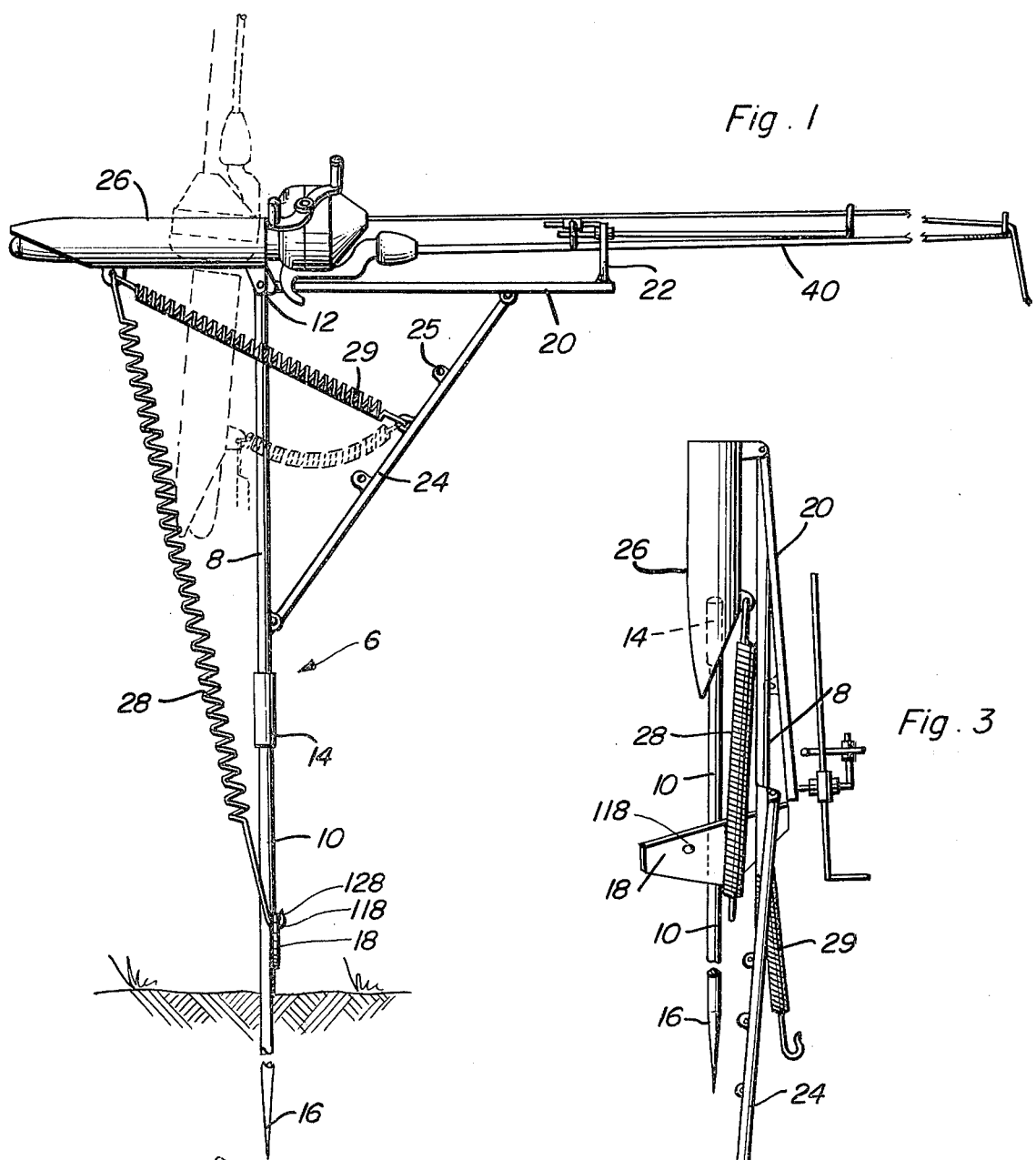
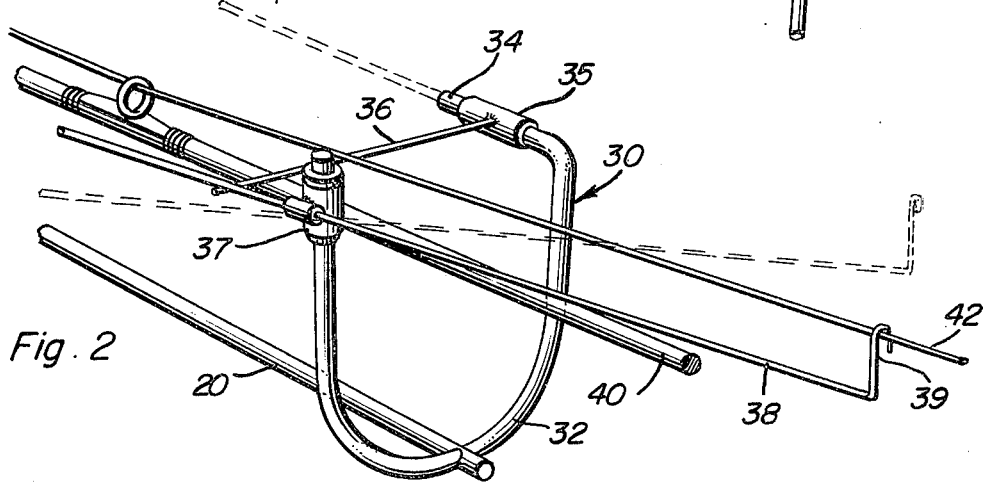

FISHING ROD HOLDER WITH AUTOMATIC HOOK SETTER

BACKGROUND OF THE INVENTION

There is a category of fishing pole holders which includes a support insertable in the ground and a mechanism to pivot the rod in a hook setting maneuver in response to a pull on the line. Such are shown by the following references:

| | | |
|---|---|---|
| 1,957,853 | G. R. Sibley | May 8, 1934 |
| 3,562,947 | J. O. W. Martin | Feb. 16, 1971 |
| 3,762,090 | M. E. Nelson et al | October 2, 1973 |

SUMMARY OF THE INVENTION

The present invention is directed to a practical fishing pole holder which can be knocked down and easily carried about in a tackle box and is not cumbersome but is convenient and practical for all fishermen. Further the device is provided with a selection of tensioned springs to bias the fishing pole in response to fish of varying weights, and a trigger mechanism also sensitive to the pull of the fish.

The present apparatus is constructed of lightweight metal materials so as to be portable, compact in design and require a minimum of storage space when not in use.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the fishing pole support in fishing position, and the position of the pole after the trigger mechanism has been released is shown in phantom.

FIG. 2 is an enlarged view of the trigger mechanism in operation, showing its release position in phantom.

FIG. 3 is a view of the device collapsed for storage.

DESCRIPTION OF THE PREFERRED EMBODIMENT

The device comprises a support system having a vertical support post 6 made of two post sections 8, 10 held together by means of a tubular sleeve member 14. The post has a pointed end 16 and a foot bar 18 which aid in inserting the post in the ground.

At the top end of the post is a bearing member designated as 12, to one side of which is attached the horizontal support rod 20 having a trigger mechanism secured at the end opposite the bearing attachment. A brace member 24, having a series of eye members 25 spaced thereon, extends between the horizontal rod 20 and the vertical post section 8 and is detachably secured to each. A tubular sleever holder 26 dimensioned to receive the butt end of a fishing pole is pivotally secured to the bearing member 12 and extends in the direction opposite support rod 20 for movement from a generally horizontal position to a vertical position under the influence of spring members. A large coiled spring member 28 is attached at one end to the unsecured end of sleeve holder 26 and at its other end by a hook 128 to an eye 118 in foot bar 18 on post section 10. This provides heavy biasing of the pole to lift larger fish. A second smaller spring member 29 may be detachably secured between the sleeve holder and the eye members 25 on brace 24 and is used in response to lighter fish. It should be noted that this spring 29 may be selectively attached to the various eye members in brace 24 to adjust the tension. The individually set springs 28, 29 can be used separately or together depending upon the snagging force desired.

The trigger mechanism generally designated as 30 will now be described in detail, see FIG. 2. A U-shaped pole holder 32 is attached at its medial bight portions to horizontal support rod 20 at the end of the rod opposite its attachment to vertical post 8. Through this U-shaped member a fishing pole and its line are extended, which are biased upwardly in response to the spring biased pole holder 26. One of the legs of U-shaped member 32 is bent at right angles to provide a tubular extension 34 parallel to the pole upon which extension slides a rotating sleeve 35. A pole suppression rod member 36 is mounted in the sleeve for rotation about extension 34 and extends in operational position over the spring biased pole and at right angles to it. A second sleeve 37 is secured to the upper portion of the opposite leg of the U-shaped member for rotation thereabout in a plane at right angles to the plane of rotation of sleeve 35. The sleeve 37 maintains its vertical position on the leg by means of washers top and bottom, in the well known manner, but is free to rotate about the leg. Upon sleeve 37 is mounted an extended release rod 38 having a hook portion 39 to engage the fishing line 42. The rod 38 is mounted on sleeve 37 at an intermediate portion of its length closer to its free end than to its hooked end 39. The release rod 38 overlies the suppressing rod member 36 at right angles thereto in the normal waiting position of the fishing pole, and together they hold the pole 40 against the upward rotation of spring biased sleeve holder 26. When a fish tugs at the line 42, it will rotate the release rod 38 as shown exaggerated in dotted lines in FIG. 2, which will cause the suppressing rod 36 to pop up in response to the spring action, the pole will rotate upwardly and the hook will set.

Looking at FIG. 2 of the drawings, the operation of the release rod 38 and the hook portion 39 relative to the fishing line 42 will be described. Normally the fish line 42 will be slack with the hook member 39 just slightly engaging therewith. However, as shown in FIG. 2, the line has just been drawn taught to effect pivotal movement of member 37 through the release rod 38. As shown, the rod 38 is just about ready to slide off the outer tip of suppressing rod 36 which will then release the mechanism to rotate the fishing pole into a vertical position. The dotted lines for rod 38 in FIG. 2 are in an exaggerated position with the fish line 42 not being shown. However, in normal practice, the hook member 39 will remain in contact with the fishing line 42 even after the device has moved to the vertical position as indicated in dotted lines in FIG. 1.

The hook setting apparatus of this invention has several variable features. The spring tension which biases the sleeve holder is variable. The large spring 28 may be used exclusively or in conjunction with smaller spring 29. The latter may itself be set for varying tension by means of attachment to different ones of the spaced eye members 25 on brace 24.

The trigger mechanism has a built in variable, as well, in the form of sliding sleeve 35 on tubular extension 34. The farther out sleeve 35 is placed with respect to the leg of the U-shaped member 32, the less movement of release rod 38 is necessary to release suppressing rod 36 and this distance may be set in accordance with the weight of the fish to be caught.

It is important that the holder be both collapsible to fit in a tackle box, and readily set up for use. The pole 10 may be removed from sleeve 14, brace 24 may be removed from support rod 20 or 8. As shown in FIG. 3, it is folded but attached to 8, and members 20, 26 are pivoted about the bearing member 12 to lie coextensively with the vertical post, and the springs are detached to hang free. It has been found that if parts 8 and 10 are about 14 inches in length, the entire collapsed holder will fit into a commercially available tackle box.

There are many alternate arrangements which come within the purview of the art. As an example, additional stability for the vertical rod may be achieved by attaching a second member parallel to the pointed end of rod 10 for insertion into the ground.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A fishing pole holder and hook setter comprising a vertical support post for insertion in the ground, a tubular sleeve holder for the reception of the butt end of a fishing pole, said holder pivoted to the top of the vertical support post to rotate from a horizontal position to a vertical position, a horizontal linear support rod attached to the top of the vertical post and extending in a direction opposite to said sleeve holder's horizontal position, spring means extending between the free end of the sleeve holder and the support system, a U-shaped support mounted at the free end of the horizontal support rod for the reception of the intermediate portion of the fishing pole and line, a trigger mechanism mounted on said U-shaped support having a positive hook means to engage the fishing line, a brace connecting said vertical support post and said horizontal support rod, the spring means to bias the sleeve holder comprising a main spring connected between the free end of the sleeve holder and the lower post section of the vertical post, and a second lighter spring is connected between the brace and the free end of the sleeve which second spring may be used alone or in conjunction with said main spring.

2. The device as in claim 1 wherein said brace member includes a series of spaced eye members mounted therein for the reception of one end of said lighter spring.

3. The device of claim 1 wherein the U-shaped member has an extension on one leg section bent to lie parallel to the horizontal rod, a first sleeve rotatable on said extension, a pole suppression rod mounted on said first sleeve, a second rotatable sleeve vertically mounted on the other leg of the U-shaped member, a pole release rod fixed to said second sleeve and carrying at one end the aforesaid line engaging hook means.

4. The device of claim 3 wherein the first sleeve is slidable on said extension.

5. A fishing pole holder and hook setter comprising a vertical support post for insertion in the ground, a tubular sleeve holder for the reception of the butt end of a fishing pole, said holder pivoted to the top of the vertical support post to rotate from a horizontal position to a vertical position, a horizontal linear support rod attached to the top of the vertical post and extending in a direction opposite to said sleeve holder's horizontal position, spring means extending between the free end of the sleeve holder and the support system, a U-shaped support mounted at the free end of the horizontal support rod for the reception of the intermediate portion of the fishing pole and line, a trigger mechanism mounted on said U-shaped support having a positive hook means to engage the fishing line, a brace connecting said vertical support post and said horizontal support rod, the fishing pole holder is collapsible and storable in a tackle box, the vertical support post comprises two separate post sections, and a sleeve for holding the sections together in the vertical extended position of the post, the upper post section having a bearing member to which both the tubuler sleeve holder and the horizontal support rod are pivotally mounted to collapse parallel with the upper post section, and the brace and the spring means are detachably connected at each of their respective ends.

* * * * *